United States Patent [19]

Rode

[11] Patent Number: 5,699,706
[45] Date of Patent: Dec. 23, 1997

[54] APPARATUS FOR CUTTING A NON-METALLIC MAGNETIC COMPONENT FROM A STRIP OF NON-METALLIC MAGNETIC MATERIAL USEABLE ON A ROTOR OR THE LIKE

[75] Inventor: John E. Rode, Fonda, N.Y.

[73] Assignee: Temper Corporation, Fonda, N.Y.

[21] Appl. No.: 595,346

[22] Filed: Feb. 1, 1996

Related U.S. Application Data

[63] Continuation of Ser. No. 58,881, May 6, 1993, abandoned, which is a continuation-in-part of Ser. No. 758,907, Sep. 11, 1991, Pat. No. 5,224,259.

[51] Int. Cl.$^6$ .............................. B26D 7/14; H02K 15/02
[52] U.S. Cl. .......................... 83/18; 83/175; 83/452; 269/154
[58] Field of Search .......................... 83/17, 18, 175, 83/176, 452, 454, 466; 269/43, 154, 164, 165, 172, 174, 234, 242, 277, 906; 73/826, 827, 828, 831, 833, 834, 835, 837

[56] References Cited

U.S. PATENT DOCUMENTS

| | | | |
|---|---|---|---|
| 211,988 | 2/1879 | Gifford | 83/18 X |
| 4,617,849 | 10/1986 | Ligon | 83/18 |
| 4,704,928 | 11/1987 | Arbter | 83/18 X |
| 4,790,464 | 12/1988 | Bortolin et al. | 83/18 X |

OTHER PUBLICATIONS

3M Electrical Specialities Division, Data Sheet, 3M Brand Magnet Material B–1030 "Prototyping for DC PM Motors and Brushless Motors with 3M Flexible Permanent Magnet Material" B–1030 , 1990.

*Primary Examiner*—Rinaldi I. Rada
*Assistant Examiner*—Clark F. Dexter
*Attorney, Agent, or Firm*—Heslin & Rothenberg, P.C.

[57] ABSTRACT

An apparatus for cutting a non-metallic magnetic component from a strip of non-metallic magnetic material useable on a rotor or the like includes a pair of blocks placeable in juxtaposed position to form a support frame having a predetermined length. Each of the strip of non-metallic magnetic material is placed on the support frame and secured by, for example, wedges to each of the blocks. The block is moved by, for example, a cam to extend the length of the support frame so that the length of a strip of non-metallic magnetic material placed on the support frame and secured to the blocks may be stretch to a desired length and cut. By using the aforementioned apparatus, the non-metallic magnetic component may be cut from a strip of non-metallic magnetic material by securing each end of a strip of non-metallic magnetic material on the blocks placed in juxtaposed position to form the support frame of predetermined length, and moving the blocks to extend the length of the support frame and stretch the strip of non-metallic magnetic material thereon to a desired length and thereafter cutting the strip to a predetermined length.

12 Claims, 1 Drawing Sheet

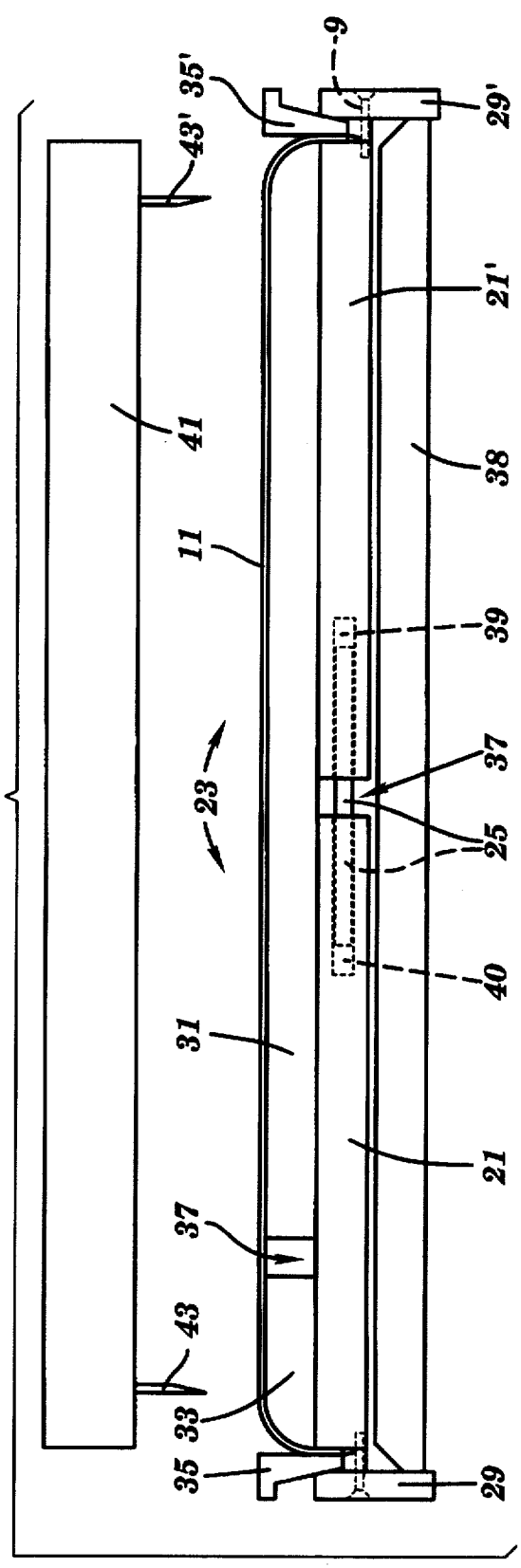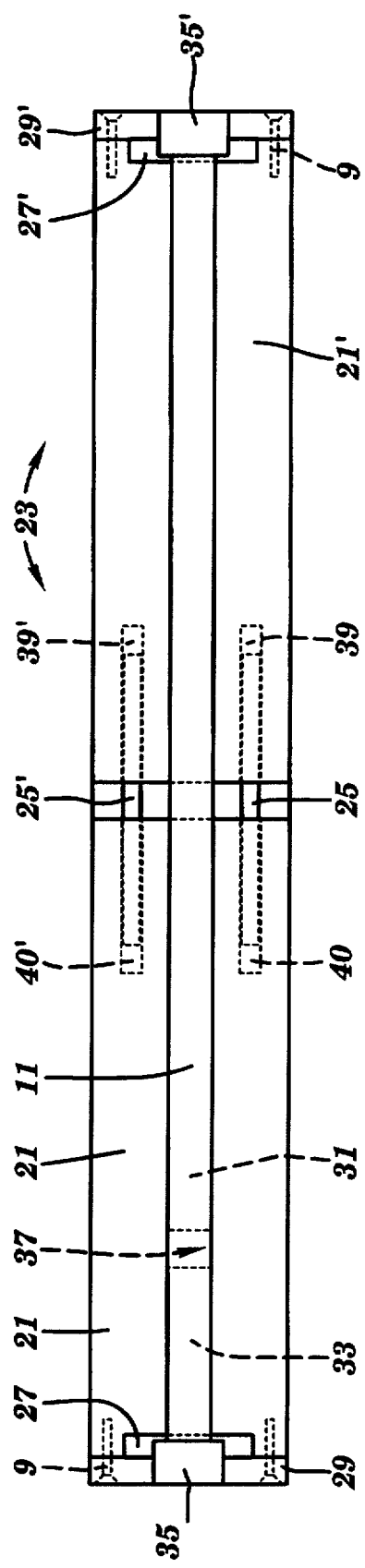

5,699,706

APPARATUS FOR CUTTING A NON-METALLIC MAGNETIC COMPONENT FROM A STRIP OF NON-METALLIC MAGNETIC MATERIAL USEABLE ON A ROTOR OR THE LIKE

CROSS REFERENCES TO RELATED APPLICATIONS

This application is a continuation of application No. 08/058,881, filed May 6, 1993, now abandoned which is a continuation-in-part of U.S. patent application Ser. No. 07/758,907, filed on Sep. 11, 1991, now U.S. Pat. No. 5,224,259.

BACKGROUND OF THE INVENTION

This invention relates to the field of magnetic rotors and shafts used to impart a rotating magnetic field, and more particularly, to an apparatus for cutting a non-metallic magnetic component from a strip of non-metallic magnetic material useable on a rotor, shaft or the like.

Various machines commonly require a rotating magnetic field in order to function as intended. For example, the electric motors or magnetic drives commonly utilize magnetic rotors in their operation. One technique for magnetizing the rotors is to manufacture the rotor itself out of a magnetic material. However, it is also possible to manufacture the rotor out of metallic material and affix a non-metallic magnetic material, such as magnetized plastic, on the outer diameter of the rotor to impart the magnetic properties. Typically, a non-metallic magnetic material may be a plastic magnetizable material in the form of a strip. The strip is magnetized such that the length of the strip contains a succession of magnetic pole pairs therethrough. For example, such a magnetizable plastic strip may be ⅛ inch wide by 1/16 inch thick and each magnetic pole pairs may be approximately ¼ inch long. Since the non-metallic magnetic strip must be imparted onto a shaft or rotor or the like, it is desirable to cut such strip to a desired length. Moreover, since the magnetic poles are of a specified distance, it is desirable to cut the non-metallic magnetic strip to a length which will accommodate a whole number of magnetic pole pairs therein.

It is therefore an object of the present invention to provide an apparatus for cutting a non-metallic magnetic component from a strip of non-metallic magnetic material useable on a rotor or the like which is capable of precisely and accurately cutting the material to a specified length.

It is also an object of the present invention to provide an apparatus for cutting a non-metallic magnetic component from a strip of non-metallic magnetic material useable on a rotor or the like which is capable of allowing the strip of non-metallic magnetic material to be cut to a specified length which will incorporate a whole number of magnetic pole pairs therein.

SUMMARY OF THE INVENTION

The aforementioned objects may be achieved through use of the apparatus for cutting a non-metallic magnetic component from a strip of non-metallic magnetic material useable on a rotor or the like.

The apparatus includes a pair of blocks placeable in juxtaposed position to form a support frame having a predetermined length, means for securing each end of strip of non-metallic magnetic material placed on the support frame to each one of said blocks, and means for moving said blocks to extend the length of the support frame wherein the length of the strip of non-metallic magnetic material placed on the support frame and secured to the blades may be stretched to a desired length and cut.

The apparatus may further comprise a means for maintaining a block aligned along an axis extending the length of the support frame when the blocks are moved and the support frame length is extended. The apparatus may also further include a backer strip having a predetermined length mounted on a top surface of the support frame. The backer strip may be capable of supporting the strip of non-metallic magnetic material thereon. The apparatus may further comprise a backer block placed in juxtaposition to the backer strip to form a predetermined length cutting surface for supporting the strip of non-metallic magnetic material thereon.

The means for securing each end of a piece of non-metallic magnetic material may include one or more wedges. The means for maintaining the blocks aligned along an axis may include one or more pins, each pin being inserted within a bore in the blocks and the bores of each block being coaxially aligned to form a coaxial cavity. The means for moving the blocks to extend the length of the support frame may include a pair of end plates each engaged to one of the blocks and a cam of predetermined length insertable between the end plates to contact the end plates and move the blocks.

The apparatus may further include a cutting means or cutter. The cutter may include an elongate block having cutting blades mounted thereon and separated by a predetermined length.

The invention may also include a method of cutting a non-metallic magnetic component from a strip of non-metallic magnetic material useable on a rotor or the like. The method may include securing each end of a strip of non-metallic magnetic material on a pair of blocks placed in juxtaposed position to form a support frame of predetermined length, moving the blocks to extend the length of a support frame and stretch the strip of non-metallic magnetic material thereon to a desired length, and cutting the strip of non-metallic magnetic material to a predetermined length.

The blocks may be moved to stretch the strip of non-metallic magnetic material to a length which contains a whole number of magnetic poles. The blocks may be moved by engaging plates affixed to the blocks with a cam of predetermined length.

BRIEF DESCRIPTION OF THE DRAWINGS

The invention may best be described in connection with the detailed description and the drawings in which:

FIG. 1 depicts the apparatus for cutting a non-metallic magnetic component from a strip of non-metallic magnetic material useable on a rotor or the like having a strip of non-metallic magnetic material mounted thereon and viewed from the side; and FIG. 2 depicts a top view of a portion of the apparatus depicted in FIG. 1 without the cutter or cutting means shown.

DETAILED DESCRIPTION

The apparatus for cutting a non-metallic magnetic component from a strip of non-metallic magnetic material useable on a rotor or the like contains a pair of blocks 21, 21' placed in juxtaposed position forming a support frame 23 of a predetermined length, means for securing each end of a strip of non-metallic magnetic material 11 to each one of said blocks 21, 21', and means for moving the blocks 21, 21' to extend the length of the support frame. The length of a strip of non-metallic magnetic material 11 placed on the support frame 23 and secured to the blocks 21, 21' may be stretched to a desired length and cut using the apparatus in accordance with the principles of the present invention.

The means for securing each end of the strip of non-metallic magnetic material 11 may include a pair of wedges 35, 35'. The wedges may be placed between each of a pair of end plates 29, 29' and each of the blocks 21, 21' where the strip of non-metallic magnetic material 11 is in contact with the wedge 35, 35' and the block 21, 21'. The wedges 35, 35' fit within gaps 27, 27' between the blocks 21, 21' and end placed 29, 29' respectively. Other means may be used for securing each end of the strip of non-metallic magnetic material 11 to the support frame 23 formed by the pair of blocks 21, 21'. For example, clamps, vises, fasteners and other equivalent means may be used to secure the strip of non-metallic magnetic material 11 and the invention is not limited to any one specific means.

Each of the end plates 29, 29' is affixed to one of the pairs of blocks 21, 21'. As shown in FIGS. 1 and 2, a fastener such as a screw 9, may be inserted through the end plates 29, 29' and into the blocks 21, 21'. However, other means for securing the end plates 29, 29' to the blocks 21, 21' may also suffice and the invention is not limited to any particular securing means.

The apparatus includes a means for maintaining the blocks aligned along an axis extending the length of the support frame when the blocks are moved and the support frame length is extended. As shown in FIGS. 1 and 2, this means may include a pair of pins 25, 25' inserted within bores 39, 39' within each of the blocks 21, 21'. The bores 39, 39' are coaxially aligned with a complimentary pair of bores 40, 40' within the opposing block 21. The blocks 21, 21' are capable of sliding relative to the pins 25, 25' to effectively extend or reduce the length of the support frame 23. The means for maintaining the blocks in alignment may include only one bore and one pin of a rectangular cross-section if desired. A single pin and bore of rectangular cross-section will allow the blocks 21, 21' to slide relative to one another without becoming disaligned.

A backer strip 31 and a backer block 33 may be placed on top of the support frame 23 formed by the blocks 21, 21'. The backer strip 31 and/or backer block 33 is preferably made of a soft steel. However, other materials of low hardness may also be preferably used. The non-metallic magnetic material 11 is mounted on the backer strip 31 and backer block 33 which in turn is mounted on the support frame 23. The strip of non-metallic magnetic material 11 is secured by the wedges 35, 35' or other suitable securing means.

A means for moving the blocks 21, 21' to extend the length of the support frame 23 such that the length of the strip of non-metallic magnetic material 11 placed on the support frame and secured to the blocks may be stretched to a desired length and cut may include a cam 38. The cam 38 is of a specified length and is placed between end plates 29, 29' to cause the blocks 21, 21' which are connected to end plates 29, 29' by fasteners such as a screw 9 to separate. The backer strip 31 and backer block 33 also move and separate relative to one another to form a gap 37 and the non-metallic magnetic material 11 stretches in length. The non-metallic magnetic material can therefore be stretched to a desired length and cut using a cutting means such as a cutter 41.

Other means for moving the blocks 21, 21' a specified length to stretch the strip of non-metallic magnetic material 11 to a specified length may also be used and the invention is not limited to any one particular means. For example, a vise, ratchet, or screw-type separating device, operatively engaged to the blocks 21, 21' or any means which is capable of moving the blocks a specified distance from one another, will suffice.

The cutting means or cutter 41 may include a pair of cutting blades 43, 43' affixed to a base. The cutting blades 43, 43' should be separated a desired distance corresponding to the desired length of the strip of non-metallic magnetic material to be cut. Any particular cutting means will suffice in accordance with the principles of the present invention. However, a cutting means which contains two blades separated at a specified length corresponding to the desired length of the strip of magnetic material to be cut is preferred.

A metal wrapped non-metallic magnetic component for use about a rotor or the like and a method of making the same is described thoroughly in U.S. patent application Ser. No. 07/758,907 filed on Sep. 11, 1991, now U.S. Pat. No. 5,224,259, and assigned to Temper Corporation, the assignee of the present invention. U.S. patent application Ser. No. 758,907 is incorporated herein by reference and made a part of this disclosure. In accordance with the aforementioned disclosure, the length of a piece of non-metallic magnetic material may be calculated in accordance with the following equation:

$$L_m = (D_s + T_m) \cdot \pi \cdot k$$

where:

$L_m$=Length of magnet material;

$D_s$=Diameter of shaft on which the completed component will be mounted less a press fit allowance, if any;

$T_m$=Thickness of magnet strip;

k=Constant which provides for an amount of interference fit of the magnetic strip and the metal cylinder into which it will later be assembled. A constant of 1.005 provides for a 0.5 percent compression of the strip length at assembly.

$\pi$=3.1416;

Using the aforementioned formula, the length of the strip of non-metallic magnetic material 11 may be easily calculated for a particular thickness of non-metallic magnetic material and a particular diameter of the shaft, rotor or the like upon which it is to be mounted. However, the particular length calculated in accordance with the aforementioned formula may not be capable of accommodating a whole number of magnetic poles within the magnetic material after the magnetic material has been magnetized. Accordingly, in accordance with the principles of the present invention, it is desirable to stretch the length of the strip of the non-metallic magnetic material 11 to a length which will accommodate a whole number of magnetic poles therein. Using the apparatus in accordance with the principles of the present invention, the strip of non-metallic magnetic material may be stretched to the desired length, magnetized and then cut. After cutting, the length of magnetic material will shrink to the length calculated using the aforementioned equation but containing a whole number of poles therein.

EXAMPLE

For example, it may be desirable to press fit a metal wrapped non-metallic magnetic component on a rotor or shaft of 4 inches in diameter where the inside diameter of the ring of magnetic material should be 0.006 inches less or 3.994 inches in diameter for a proper press fit. If the thickness of the magnet is 0.062 inches then the assembled length should be $\pi$ multiplied by the press fit diameter or 12.742 inches. Using the aforementioned formula, the length of the magnetic material should be multiplied by the constant (k) of 1.005 to a resulting length of 12.806 inches. However, if the magnetic poles in the material are spaced 0.25 inches apart, then 12.806 inches will not incorporate a whole number of magnetic pole pairs. Therefore, the magnetic material should be stretched to 13 inches so that a whole number of magnetic poles will be located within the cut strip of magnetic material. Accordingly, the amount of stretch should be 13 inches less 12.806 inches or 0.194 inches. Therefore, a magnetic strip having a section of 12.806 inches can be stretched an additional 0.194 inches using the apparatus in accordance with the principles of the present invention, magnetized and cut using the apparatus to 13 inches. After the strip is cut, it will shrink back to the desired 12.806 inches but will have a whole number of magnetic pole pairs throughout its length. Each pole pair will be approximately (12.806)(0.250)/13 or 0.246 inches in length after the strip has relaxed to its unstretched length.

The apparatus may effectively be used by placing the strip of non-metallic magnetic material thereon as shown in FIG. 1 and securing the strip using wedges 35. The cam 38 of specified length should be placed between end plates 29, 29' to stretch the magnetic material to the calculated specified length. The magnetic material should then be magnetized using a conventional magnetizing device which is well known in the art. Such a device is available from Magnetic Instrumentation, Inc. of Indianapolis, Ind. The apparatus with the stretched strip of magnetic material thereon may be placed within a magnetizer for magnetization. The cutter 41 may then be imparted to the strip of non-metallic magnetic material so that each cutting blade 43, 43' contacts the strip 11 simultaneously to create an even cut. The strip of magnetic material may then be inserted into a metal cylinder which has been fabricated as taught in U.S. patent application Ser. No. 758,907.

Although the invention has been described in accordance with the embodiments depicted herein, it is apparent to one skilled in the art that various modifications and substitutions may be made without departing in any way from the spirit of the invention as defined by the following claims.

What is claimed is:

1. An apparatus for supporting a strip of non-metallic magnetizable material for cutting of a non-metallic magnetic component from said strip using a cutter, said apparatus comprising:

a pair of blocks placed in juxtaposed position to form a support frame having a predetermined length;

means for securing each end of the strip of non-metallic magnetizable material placed on the support frame to each one of said blocks;

means for moving said blocks to extend the length of the support frame wherein the length of the strip of non-metallic magnetizable material placed on the support frame and secured to said blocks is stretched to a desired length and cut; and means for maintaining the blocks aligned along an axis extending the length of the support frame when said blocks are moved and said support frame length is extended;

wherein the means for maintaining the blocks aligned along an axis comprises at least one pin, each end of said at least one pin being inserted within a bore in each of said blocks, said bores of said blocks being coaxially aligned to form a coaxial cavity.

2. An apparatus for supporting a strip of non-metallic magnetizable material for cutting of a non-metallic magnetic component from said strip using a cutter, said apparatus comprising:

a pair of blocks placed in juxtaposed position to form a support frame having a predetermined length;

means for securing each end of the strip of non-metallic magnetizable material placed on the support frame to each one of said blocks;

means for moving said blocks to extend the length of the support frame wherein the length of the strip of non-metallic magnetizable material placed on the support frame and secured to said blocks is stretched to a desired length and cut; and means for maintaining the blocks aligned along an axis extending the length of the support frame when said blocks are moved and said support frame length is extended;

wherein the means for moving said blocks to extend the length of the support frame comprises a pair of end plates, each of said end plates being engaged to one of said blocks and a cam of predetermined length disposed for insertion between said end plates to contact said end plates and move said blocks.

3. The apparatus of claim 1 or 2 wherein the means for securing each end of the strip of non-metallic magnetizable material comprises at least one wedge.

4. The apparatus of claim 3 further comprising a backer strip having a predetermined length mounted on a top surface of the support frame for supporting at least a portion of the strip of non-metallic magnetizable material thereon.

5. The apparatus of claim 4 further comprising a backer block placed in juxtaposition to said backer strip to form a predetermined length cutting surface for supporting the strip of non-metallic magnetizable material thereon.

6. The apparatus of claim 1 wherein said at least one pin comprises a rectangular cross section and wherein each bore comprises a rectangular cross section.

7. The apparatus of claim 1 or 2 in combination with said cutter which is imparted to the strip of non-metallic magnetizable material.

8. The apparatus of claim 7 wherein the cutter comprises an elongate block having cutting blades mounted thereon separated by a predetermined length.

9. A method of cutting a non-metallic magnetic component from a strip of non-metallic magnetizable material comprising:

determining a desired length of said component;

securing each end of said strip of non-metallic magnetizable material on a respective one of a pair of blocks placed in juxtaposed position to form a support frame of predetermined length, a segment of said strip of non-metallic magnetizable material having a length equal to said desired length of said component;

stretching said strip of non-metallic magnetizable material by moving said blocks to extend the length of the support frame such that said segment of said strip having said desired length of said component is expanded to a length equal to a desired whole number of units corresponding in length to magnetic poles of a predetermined length; and cutting the expanded segment from the strip of non-metallic magnetizable material.

10. The method of claim 9 wherein said blocks are moved by engaging plates affixed to said blocks with a cam of predetermined length.

11. The method of claim 9 wherein the strip of cutting the expanded segment is performed using a cutter having a pair of blades thereon spaced apart at a length corresponding to the length of the expanded segment.

12. The method of claim 9, wherein the strip of cutting the expanded segment is preceded by magnetizing the expanded segment.

* * * * *

UNITED STATES PATENT AND TRADEMARK OFFICE
CERTIFICATE OF CORRECTION

PATENT NO. : 5,699,706

DATED : Dec. 23, 1997

INVENTOR(S) : Rode

It is certified that error appears in the above-identified patent and that said Letters Patent is hereby corrected as shown below:

Column 6, line 58,   "strip" should read --step--.

Column 6, line 62,   "strip" should read --step--.

Signed and Sealed this

Twenty-sixth Day of May, 1998

Attest:

BRUCE LEHMAN

Attesting Officer   Commissioner of Patents and Trademarks